H. Thompson,
Beefsteak Crusher.
No. 94,852.  Patented Sep. 14, 1869.

WITNESSES.
Alex F. Roberts
Knott Brooks

INVENTOR.
H. Thompson
per Munn &Co
Attorneys.

United States Patent Office.

HORACE THOMPSON, OF CONCORD, NEW HAMPSHIRE.

Letters Patent No. 94,852, dated September 14, 1869.

IMPROVED BEEFSTEAK-CRUSHER.

The Schedule referred to in these Letters Patent and making part of the same.

*To all whom it may concern:*

Be it known that I, HORACE THOMPSON, of Concord, in the county of Merrimack, and State of New Hampshire, have invented a new and improved Beefsteak-Crusher; and I do hereby declare that the following is a full, clear, and exact description thereof, which will enable others skilled in the art to make and use the same, reference being had to the accompanying drawings, forming part of this specification, in which—

Figure 1:
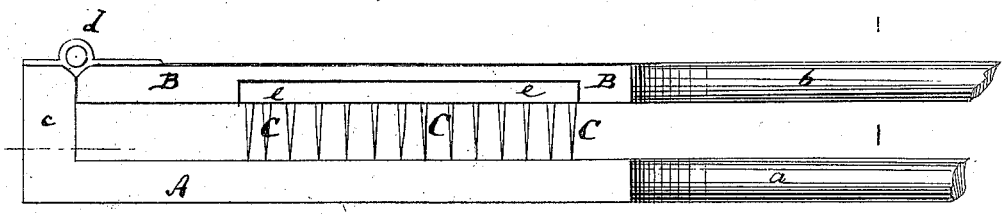
Figure 1 represents a side view of my improved beefsteak-crusher.
Figure 2:
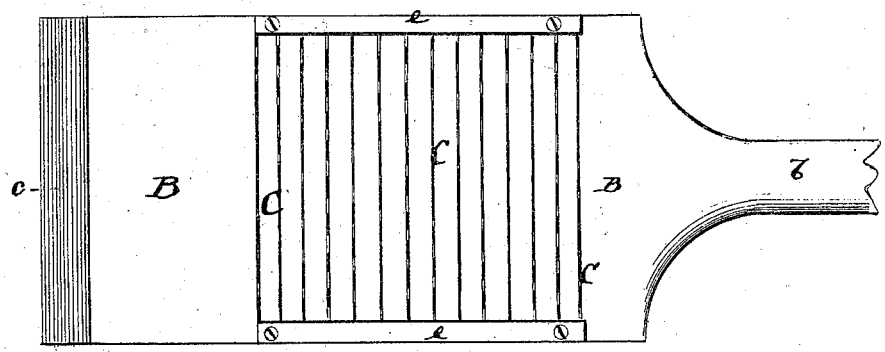
Figure 2 is a plan view, partly in section, of the cutting-plate.

Similar letters of reference indicate correspending parts.

This invention relates to a new beefsteak-crusher, which is so constructed that it will cut entirely through the fibres of the meat without separating the same, thereby making the steak tender and palatable.

A, in the drawing, represents a wooden or other plate, of suitable form, and provided with a handle, *a*, at one end.

B is a similar plate, having a handle, *b*.

The plate A has an upward-projecting ear, *c*, at the end opposite the handle, and to this ear the plate B is hinged at *d*.

Figure 3:
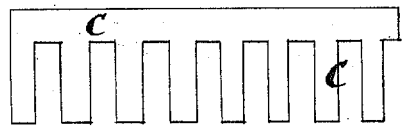
Figure 3 is a detail side view of one of the cutters.

The plate B has a series of transverse grooves at its under side, adapted to receive the cutters C C, which are metal plates, notched at their cutting-edges, to form rows of separated knives, as shown in fig. 3.

The plates C are so set that the cutting-edges on one are in line with the notches of those in front and rear.

The cutters project from the plate B so far that they will all reach the plate A, when the two plates are brought parallel, as shown in fig. 1.

Lateral displacement of the plates C is prevented by bars *e e*, which are countersunk in the sides of the plate B, as shown.

The steak to be crushed is placed upon the plate A, and then B is swung down to force the knives into the meat.

Having thus described my invention,

I claim as new, and desire to secure by Letters Patent—

In a beefsteak-crusher, the combination of a hinged and recessed compresser, B, provided with a series of chambers for the reception of the detachable cutter-stocks C, all as shown and described.

HORACE THOMPSON.

Witnesses:
E. W. ABBOTT,
K. C. PRESCOTT.